(Model.)
J. SERDINKO.
PORTABLE DARK ROOM.
No. 254,392. Patented Feb. 28, 1882.
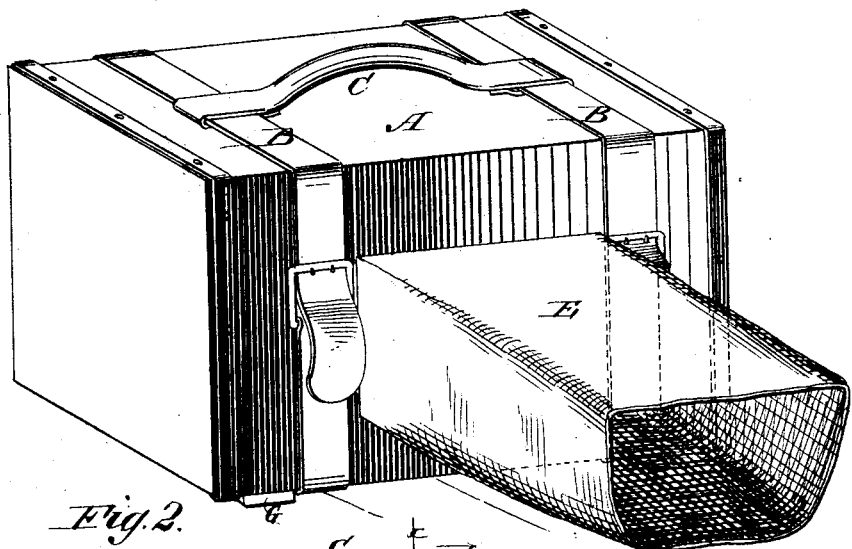
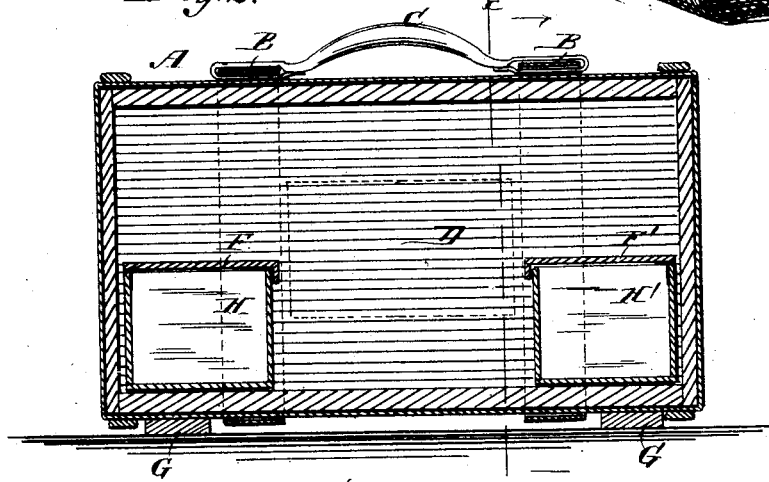
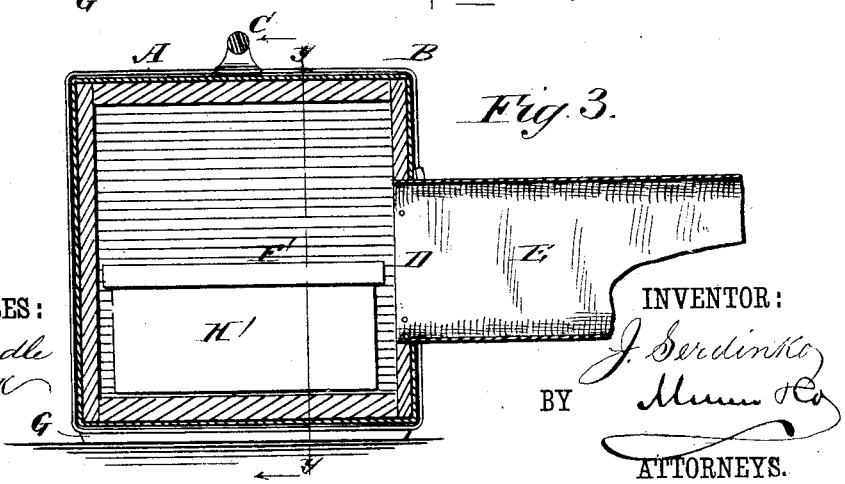
WITNESSES:
F. McArdle
C. Sedgwick
INVENTOR:
J. Serdinko
BY Munn & Co
ATTORNEYS.

UNITED STATES PATENT OFFICE.

JOHN SERDINKO, OF NEW BRAUNFELS, TEXAS.

PORTABLE DARK ROOM.

SPECIFICATION forming part of Letters Patent No. 254,392, dated February 28, 1882.

Application filed December 22, 1881. (Model.)

*To all whom it may concern:*

Be it known that I, JOHN SERDINKO, of New Braunfels, Comal county, Texas, have invented a new and Improved Portable Dark Room for Dry Photographing-Plates, of which the following is a full, clear, and exact description.

The object of my invention is to provide a new and improved portable dark room for dry photographing-plates, in which the plates can be transferred to and from the plate-holder of the camera-box without being exposed either to light or dampness.

The invention consists in a box provided with an opening in one side and a sleeve of pliable material extending outward from this opening, which box contains two smaller boxes for receiving the exposed and unexposed dry plates. The box is provided with a handle for carrying it.

Reference is to be had to the accompanying drawings, forming part of this specification, in which similar letters of reference indicate corresponding parts in all the figures.

Figure 1 is a perspective view of my improved portable dark room for dry photographic plates. Fig. 2 is a longitudinal sectional elevation of the same on the line $y\,y$, Fig. 3. Fig. 3 is a cross sectional elevation of the same on the line $x\,x$, Fig. 2.

The box A is covered with oil-cloth, leather, cloth, or other suitable material, and is surrounded by two straps, B, connected by a handle, C, for carrying the box. If desired, this handle can be attached directly to the box.

One of the sides of the box A is provided with an aperture, D, from which a flexible sleeve, E, of oil-cloth, cloth, leather, or other suitable material, projects from the box.

The opening D and the sleeve E must be of such size as to permit the plate-holding frame of the camera to be passed through this sleeve and opening into the box A. Two compartments or boxes, H H', provided with swinging or other lids, F F', are located in the box A, one of these compartments or boxes being at each end of the box A. One of these compartments—for instance H—contains dry plates that have not been exposed to the action of light, and the other compartment, H', contains the exposed dry plates.

The box A is preferably provided with transverse strips G on the bottom, so that the box can be placed on the ground without being moistened or soiled.

The operation is as follows: The operator passes the plate-holding frame of the camera through the sleeve E into the box A, opens the frame, and deposits the exposed dry plates in the box H', and takes a fresh plate from the box H and places it into the plate-holder, which is then withdrawn. In this manner the plates can be placed in and removed from the plate-holder without being exposed to light or dampness. While manipulating the plates with one hand the sleeve is pressed against the arm with the other hand, so that no light can pass into the box by accident. A large quantity of dry plates can be transported in the box A very conveniently, and the portable dark room thus also serves as a receptacle for transporting the plates. The box A can be made in various sizes corresponding to the various sizes of the plates.

Having thus described my invention, I claim as new and desire to secure by Letters Patent—

A box having the aperture D, the flexible sleeve E, projecting from the inside of said aperture, and the end compartments, H H', provided with swinging lids, as shown and described, whereby the inside may form a dark chamber, in which the plates may be transferred from and to the plate-holder of the camera without being exposed either to light or dampness.

JOHN SERDINKO.

Witnesses:
S. H. HOLTZ,
H. E. MEYER.